United States Patent [19]

Takagaki

[11] Patent Number: 5,501,757
[45] Date of Patent: Mar. 26, 1996

[54] PROCESS FOR PRODUCTION OF A BAG HAVING LINEAR RIBS

[75] Inventor: Tadao Takagaki, Tokyo, Japan

[73] Assignee: Sumitomo Bakelite Co., Ltd., Tokyo, Japan

[21] Appl. No.: 269,579

[22] Filed: Jul. 1, 1994

[30] Foreign Application Priority Data

Jul. 6, 1993 [JP] Japan .................... 5-191937

[51] Int. Cl.⁶ .......................... B32B 31/18; B32B 31/20
[52] U.S. Cl. .......................... 156/196; 156/201; 156/209; 156/219; 156/267; 156/290; 156/308.4; 156/311; 264/145; 264/284; 264/293
[58] Field of Search .................... 156/196, 199, 156/201, 204, 219, 221, 267, 269, 282, 290, 308.4, 311, 324, 242, 209, 384, 245; 264/138, 145, 153, 280, 284, 285, 293; 383/104, 119; 53/128.1, 410; 425/407

[56] References Cited

U.S. PATENT DOCUMENTS

| | | | |
|---|---|---|---|
| 2,538,920 | 1/1951 | Shumann | 383/119 |
| 2,874,751 | 2/1959 | Norton | 425/407 |
| 3,036,945 | 5/1962 | Souza | 156/219 |
| 3,799,827 | 3/1974 | Takimoto et al. | 156/219 |
| 4,055,109 | 10/1977 | Kan . | |
| 4,526,565 | 7/1985 | Hummel et al. . | |
| 5,048,977 | 9/1991 | Robbins, III . | |
| 5,352,043 | 10/1994 | Takagaki et al. | 383/119 |

FOREIGN PATENT DOCUMENTS

| | | |
|---|---|---|
| 0253532 | 1/1988 | European Pat. Off. . |
| 2436228 | 2/1975 | Germany . |
| 3222017A1 | 12/1983 | Germany . |
| WO92/21581 | 12/1992 | WIPO . |

Primary Examiner—Michael W. Ball
Assistant Examiner—Richard Crispino
Attorney, Agent, or Firm—Frishauf, Holtz, Goodman, Langer & Chick

[57] ABSTRACT

A process for production of a bag having linear ribs uses an apparatus for forming linear ribs which comprises a plate mold having linear protrusions on both faces thereof and upper and lower female molds placed at both sides of the mold, having penetrated linear cavities at positions corresponding to those of the linear protrusions and capable of opening and closing as desired. Multi-layer resin films are inserted between the plate mold and the female molds. The molds are heated and pressed to each other to prepare multi-layer resin films having linear ribs. A bag is produced using the multi-layer resin film having linear ribs thus prepared. Ribs convex to the outside can be formed on the multi-layer film comprising a layer of a resin having a low melting point at the inside and a layer of a resin having a high melting point at an outer side thereof. The self-supporting bag produced by the process has a higher stiffness.

16 Claims, 8 Drawing Sheets

PROCESS FOR PRODUCTION OF A BAG HAVING LINEAR RIBS

BACKGROUND OF THE INVENTION

1. Field of the Invention

The present invention relates to a process for production of a bag having linear ribs which uses a resin film having linear ribs and enhanced stiffness as the material thereof and is suitable for production of a self-supporting bag.

2. Description of the Related Art

Bags made of resin films to which the self-supporting property is provided by the structure of a gazette folding at the bottom have heretofore been known.

However, the upper part of these bags has a lower stiffness even though the bottom part has the self-supporting property provided by the structure of gazette folding. Particularly when the bag contains a small amount of contents, the bag shows inferior stability of the self-supporting property, such as bending down of the upper part of the bag.

To solve the problem described above, the present inventors already proposed a self-supporting bag having higher stability in shape, in which a multi-layer resin film containing a resin layer of a high melting point and higher toughness is used, a shape having a constriction at the upper part of the bag is adopted and ribs are formed at the surface of the film for the bag to enhance the self-supporting property (International Patent Application Laid-Open No. WO 92/21581).

The bag made of a multi-layer resin film and having ribs proposed above uses a material sheet of a multi-layer resin film containing a layer of a heat adhesive resin having a low melting point and heat sealing property at the inside of the film and a layer of a resin having a high melting point and higher toughness at the outside of the film.

In this technology, it is difficult to mold the layer of a resin having a high melting point in the material sheet of the multi-layer resin film into the form of ribs. Thus, ribs are formed on the inner face of the film for a bag by varying the thickness of the layer of a heat adhesive resin by pushing a heated mold against the layer of a heat sealing resin having a low melting point while the layer of the resin having a high melting point is kept in a flat shape. Because of this situation, the ribs herein are formed on the inner side of the bag in a corrugated shape.

The ribs formed on the inside of a bag in a corrugated shape have a shortcoming that the effect of enhancing stability of the shape of a bag is insufficient because the shape of the bag is convex to the outside and a ridge of a rib protruded to the inside has small resistance to an inward deformation of the bag.

As described above, when a film forming a bag has good stiffness, handling of the bag, such as discharge of contents and storage of the bag, can be conveniently made not only when the bag is a self-supporting bag but also when the bag is a simple packaging bag. Thus, a bag having linear ribs which is formed from a film having ribs and still more improved stiffness is generally useful.

SUMMARY OF THE INVENTION

The present invention accordingly has an object of providing a process for production of a bag made of a multi-layer resin film containing a layer of a resin having a low melting point at the inside thereof and a layer of a resin having a high melting point at the outside thereof, and having enhanced stiffness by providing the bag with ribs convex to the outside of the multi-layer resin film forming the bag.

As the result of extensive studies by the present inventors, it was considered that stiffness of the convex surface of a packaging bag can be increased by forming ribs convex to the outside in the layer of a resin having a high melting point and high toughness at the surface of the bag. Thus, it was mentioned that, when the heat sealing resin at the inner layer is molded by melting into a shape convex to the outside and then the shape convex to the outside is fixed by cooling the resin, the layer of the resin having a high melting point is deformed to a shape similar to the shape of the layer of the resin having a low melting point and ribs convex to the outside can be formed also on the layer of a resin having a high melting point and that ribs are formed by deformation of the layer of a resin having a high melting point and high toughness at the outside face of the bag without heating the layer of the resin having a high melting point to a temperature above the melting point. The present invention has been completed on the basis of these considerations.

Accordingly, the present invention provides [1] a process for production of a bag having linear ribs comprising:

(1) a process of forming linear ribs on material sheets of a multi-layer resin film which comprises: using an apparatus for forming linear ribs which has a mold of a plate shape having linear protrusions on both faces thereof, an upper female mold and a lower female mold placed, respectively, at the upper side and the lower side of the mold, having penetrated linear cavities at positions corresponding to the linear protrusions on both faces of the mold and capable of opening or closing as desired, and an upper heating panel and a lower heating panel placed, respectively, at the upper side of the upper female mold and at the lower side of the lower female mold and capable of opening or closing as desired, placing the material sheet of a multi-layer resin film containing a layer of a heat adhesive resin having a low melting point as a surface layer thereof in each of the space between the mold and the upper female mold and the space between the mold and the lower female mold in such a manner that the layers of the heat adhesive resin having a low melting point are faced to the mold, pushing the material sheets of the multi-layer resin film at linear parts over or below the linear ribs on both faces of the mold into the linear cavities in the female molds by pressing the upper female mold and the lower female mold toward the mold with a driving mechanism of the female molds or with compression of the heating panels from outside of the female molds, and moving the upper heating panel and the lower heating panel heated to a temperature of or above the softening point of the heat adhesive resin having a low melting point toward the mold from outside of the female molds with a driving mechanism of the heating panels;

(2) a process of heat sealing the material sheets of the multi-layer resin film having linear ribs at the parts corresponding to the peripheral heat sealing parts necessary for forming a desired bag; and (3) a process of cutting off and separating the bag from the heat sealed material sheets of the multi-layer resin film having linear ribs.

The present invention also provides [2] a process for production of a bag having linear ribs as described in [1], wherein the process comprises (4) a process of fixing the linear ribs by cooling immediately after the process (1).

The present invention also provides [3] a process for production of a bag having linear ribs as described in [1] or

[2], wherein the process (2) comprises inserting a separate folded material sheet of a multi-layer resin film for the bottom part between edges of the two material sheets of a multi-layer resin film in such a manner that the layers of the heat adhesive resin are faced to each other and the edges of the two material sheets and the inserted folded sheet form a W-shape, connecting the two material sheets of a multi-layer resin film as a continuous sheet through the folded material sheet of a multi-layer resin film for the bottom by heat sealing each end of the folded material sheet of a multi-layer resin film for the bottom separately to each lower edge of the material sheets of a multi-layer resin film, and heat sealing the parts corresponding to the side edge parts of a bag.

The present invention also provides [4] a process for production of a bag having linear ribs as described in [1], [2] or [3], wherein the mold has a cooling mechanism.

The present invention also provides [5] a process for production of a bag having linear ribs as described in [1], [2], [3] or [4], wherein the upper female mold and the lower female mold are made of a thermally insulating material or have a cooling mechanism.

The present invention also provides [6] a process for production of a bag having linear ribs as described in [1], [2], [3], [4] or [5], wherein the linear ribs have a planar shape of vertical curved lines, vertical straight lines, inclined curved lines, inclined straight lines or a combination of these lines.

The present invention also provides [7] a process for production of a bag having linear ribs as described in [1], [2], [3], [4], [5] and [6], wherein the bag has side edges having a shape with constriction.

The present invention also provides [8] a process for production of a bag having linear ribs as described in [1], [2], [3], [4], [5], [6] and [7], wherein the multi-layer resin film of the material sheet has the outermost layer of a resin having a melting point higher than that of the heat adhesive resin in the innermost layer and the heating panels are heated to a temperature higher than the melting point of the heat adhesive resin and lower than the melting point of the resin of the outermost layer.

The present invention also provides [9] a process for production of a bag having linear ribs as described in [1], [2], [3], [4], [5], [6], [7] and [8], wherein the bag has the self-supporting property.

Other and further objects, features and advantages of the invention will appear more fully from the following description.

BRIEF DESCRIPTION OF THE DRAWINGS

The invention will be described with reference to the accompanying drawings, wherein.

The numbers and characters in the figures have the meanings as listed in the following:

1. a roll of a material sheet
2. a material sheet of a multi-layer resin film
21. a multi-layer resin film
22. a multi-layer resin film
23. a multi-layer resin film of the bottom part
24. a folding line
3. a dancer roll
4. an apparatus for folding a multi-layer resin film of the bottom part and transferring the folded sheet.
5: a lamination roll
6: a transfer roll
7: an apparatus for forming linear ribs
71: a mold
72: an upper female mold
73: a lower female mold
74: an upper heating panel
75: a lower heating panel
76: a liner protrusion
77: a linear cavity
78: an upper female mold having a cavity in it
79: a lower female mold having a cavity in it
80: an inlet for cooling water
81: a protrusion
8: a sealing unit for the bottom part
9: a cooling unit of the sealed part at the bottom
10: a sealing unit for the side edges
11: a cooling unit of the sealed part at the side edges
12: a photoelectric tube for detecting the position of cutting
13: an apparatus for cutting
14: an apparatus for winding a scrap
15: a bag of the product
A: a constriction
B: a side edge at the upper part
C: a side edge at the central part
D: a side edge at the bottom E: a side edge at the top F: a heat sealed part at the edge of the bottom H: a side edge at the position of the folded line of the bottom part K: a punched hole $L_1$: a rib $L_2$: a rib P: a metal plate

DETAILED DESCRIPTION OF THE INVENTION

As the multi-layer resin film used in the present invention, a long film sheet comprising, as the essential constituting layers thereof, a layer of a heat adhesive resin having a low melting point which can be sealed by heating at least as the innermost layer and a resin layer for providing stiffness to the multi-layer resin film at the outside of the layer of a heat adhesive resin. The resin of the outer layer has a higher melting point than that of the resin of the innermost layer. When a resin having particularly higher toughness is selected, it is more probable that the resin has a higher melting point.

A preferred laminated structure of the material sheet of the multi-layer resin film used in the present invention comprises a layer of a heat adhesive resin having a low melting point and a layer of a resin having a high melting point as the essential constituting layers thereof. Layers of other resins, such as a layer having a gas barrier property and a layer having adhesive property, may be laminated between the two layers described above or at the outside of the layer of the resin having a high melting point. The adhesive property described above is the property to promote closer lamination of layers in the multi-layer resin film when the layer having the property is placed between the layers.

As the material of the innermost layer of a resin having the heat sealing property used in the present invention, a generally known resin having the heat sealing property can be used without any restriction. A resin having a melting point lower than that of the resin of the outer layer, such as polyethylene, polypropylene, polystyrene, an ethylene-vinyl acetate copolymer, polyethylene terephthalate and the like, can be preferably used.

As the resin having a high melting point which provides toughness to the film, a resin having a higher toughness than that of the resin of the heat sealing layer, such as a nylon resin like 6-nylon, 66-nylon or the like, a polyester resin like polyethylene terephthalate, polybutylene terephthalate or the like, a polycarbonate resin, polypropylene, an ionomer, a polyether or the like, can be used without any restriction.

As the resin layer additionally laminated to the material sheet comprising the two layers described above as the essential constituting layers thereof, layers having the same objects as the two layers described above may be laminated suitably and various kinds of layer providing other functions, such as gas barrier property, the adhesive property or the like, may be laminated suitably as well. As the layer providing the gas barrier property, a layer of an ethylene-vinyl acetate copolymer, a metal foil, a layer of polyvinylidene chloride or the like can be used. As the layer providing the adhesive property, a layer of a polyolefin modified with maleic anhydride, a layer of an isocyanate adhesive material or the like can be used.

The process of the present invention can be applied through the following processes using the material sheet described above.

The material sheet of a multi-layer resin film supplied from a roll of the material sheet is folded along the center line of the sheet in such a manner that the layer of the heat adhesive resin is faced inside. The sheet is then cut along the folded line to prepare two material sheets of the multi-layer resin film.

The upper one and the lower one of the two material sheets thus prepared are fed to the upper face and the lower face of the mold of a plate shape in the apparatus for forming linear ribs, respectively, in a one-pitch movement and the material sheets are stopped there. Then, the upper female mold and the lower female mold are pressed against the material sheets from the upper side and the lower side, respectively, and ribs are formed by pushing the material sheets of the multi-layer resin film at the parts corresponding to the linear protrusions on the mold into the linear cavities of the female molds with the linear protrusions on the mold. The heated panels are moved closer to the female molds. The layer of the heat adhesive resin having a low melting point laminated at the opposite face of the material sheet of the multi-layer resin film is exposed at the part of the linear cavities of the female molds. The exposed part is softened by the radiation from the heated panels and take the shape corresponding to the linear protrusions on the mold. For pushing the female molds to the material sheets of the multi-layer resin film at the surfaces of the mold, the female molds may be moved by a driving mechanism for the two female molds or the heating panels may be compressed together with the female molds by a driving mechanism for the two heating panels while the driving mechanism for the two female molds is kept inactive.

After the linear ribs are formed, the two heating panels alone are separated from the material sheets of the multi-layer resin film while the material sheets are held with the two female molds on the mold. The linear ribs thus formed are fixed to the shape by cooling with air and the process of forming linear ribs (1) is finished. In the present invention, the ribs may be cooled and the shape of the ribs may be fixed by natural cooling with the air as described above. However, forced cooling by blowing an air stream to the linear cavities of the female molds or by using a metal mold having a cooling mechanism using a fluid of a low temperature at the inside of the mold is preferable for decreasing the time of the operation.

The one-pitch movement adopted in the present invention can be conducted according to conventional methods used in film processing. For example, the following method may be adopted. The material sheet supplied continuously from the roll is temporarily stored in a storage part using flexibly moving rolls and the part of the material sheet of the one pitch length is intermittently moved to the processing apparatus from the storage part with the forced movement of pinches holding edges of the material sheet of the multi-layer resin film.

The part of the sheet finished with the process of forming ribs is moved further to a table of the process of heat sealing by the one-pitch movement. The material sheet of the multi-layer resin film is treated with (2) the process of heat sealing at the places corresponding to the peripheral parts of the bag during the stopping period of the one-pitch movement. The heat sealed material sheet is then moved to (3) the process of cutting by the one-pitch movement and the peripheral parts of the bag are cut off to produce the bag. The scrap sheet remaining after the bag has been cut off is wound by a scrap roll. In the series of the processes described above, the material sheet of the multi-layer resin film is processed by moving to the process (1), the process (2) and the process (3), successively in every one-pitch movement. The process (2) may be divided into several operations, such as two or more kinds of heat sealing operations and cooling operations accompanying them.

When (4) the process of fixing the formed linear ribs by cooling is conducted immediately after the process (1) of the present invention, the heating panels are separated from the multi-layer resin films after the heat adhesive resin layers of the multi-layer resin films are softened by the heat of the heating panels and the multi-layer resin film is cooled while the shape of the ribs are kept as they are formed. In the process (4), it is preferred that the cooling treatment is conducted quickly at the same position as that in (1) the process of forming linear ribs.

In the process (2), a conventional process of forming a self-supporting bottom structure can be adopted. In this process, a folded film is inserted between the two multi-layer resin films having ribs at least at one of the end parts of the two multi-layer resin films and then the films are heat sealed. Ribs may also be formed on the multi-layer resin films by (1) the process of forming linear ribs after the folded film forming the bottom part has been inserted between the films.

Figure 9:
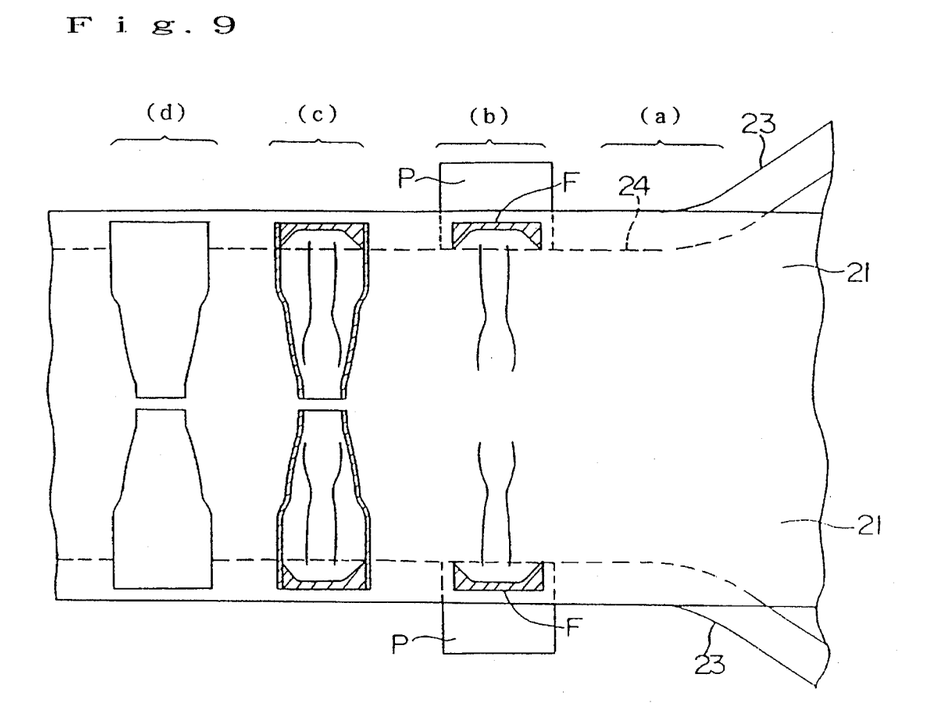
FIG. 9 shows a schematic diagram showing the process of production which shows order of producing a bag using a multi-layer resin film having ribs.

In the process (2) of the present invention, for example, the heat sealing can be conducted by the process shown in FIG. 9.

Figure 10:
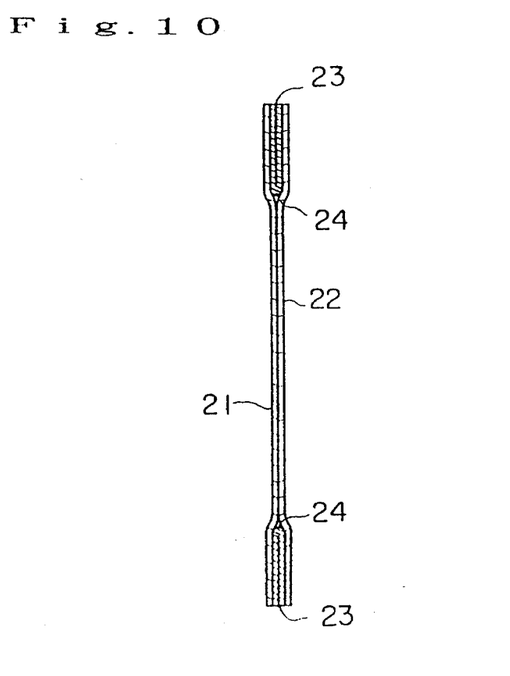
FIG. 10 shows a sectional view of the laminate structure of the material used in the process of production shown in FIG. 9.

When the two material sheets of the multi-layer resin film, 21 and 22, which have been put together as shown in FIG. 10 and have ribs formed on them are fed to the position (a) in the process (1) shown in FIG. 9 from the right side, a separate multi-layer resin film of the bottom part 23 which has been folded at the folding line 24 is fed to each of the upper edge and the lower edge of the material sheets. The folded multi-layer resin films of the bottom part are inserted between both edges of the material sheet of the multi-layer resin film having ribs and a W-shape shown in FIG. 10 is formed at each side with the folded multi-layer resin film of the bottom part and the edges of the material sheets of the multi-layer resin film, 21 and 22, placed at both sides of the folded multi-layer resin film as shown in the sectional view of FIG. 10. Thus, the laminate having the sectional structure shown in FIG. 10 is formed. Then, the combined material sheets are transferred to the position (b) where the metal plate P is placed by the one-pitch movement. When the combined material sheets of the multi-layer resin film are stopped, the specified heat sealed part at the bottom edge F is formed by the heat panels pressed to the metal plate over the material sheets. The heating panels are adjusted to a temperature higher than the melting point of the heat adhesive resin having a lower melting point at the inside of the laminate and lower than the melting point of the resin having a higher melting point so that the heat adhesive resin having a lower melting point alone is heat sealed by melting when the heat panels are pressed to form the specified heat sealed part at the bottom edge F.

The combined material sheets are then transferred to the position (c) of a table for heat sealing side edges from the position of the metal plate (P) and stopped. The heat seal on the side edges are formed there. The combined material sheets are transferred to the position (d) for the process of cutting off. The bag is separated by cutting off the combined sheets at the periphery of the heat sealed parts. The scrap sheet remaining after the bag is cut off is wound by a roll.

When the combined material sheets are cut off along the central line in the final process of cutting off (3), two bags are produced simultaneously at the upper part and at the lower part of the combined material sheets of the multi-layer resin film.

When the folded material sheet of the multi-layer resin film for the bottom part is supplied to only one end of the material sheets and the heat sealed part of the bottom edge F is formed only at one end of the material sheets similarly, a self-supporting bag can be produced in the same manner as that described above except that the number of the bag produced is a half of the process described above.

When the process of forming the bottom structure is conducted with only one end of the material sheet of the multi-layer resin film, another process of producing a bag having ribs may be adopted. In this process, the heat sealed part at the lower edge F shown in (b) of FIG. 9 is formed before the process of forming ribs and side edges can be heat sealed after the process of forming ribs (1).

In the above description of the processes, the heat sealing process of the side edges of the bag with the heating panels is made in every unit of the one-pitch movement for the simplicity. However, in the generally adopted process, the bags are placed in positions closest to each other and the whole area of the space between the bags is heat sealed successively with the heating panels. This process is more convenient from the point of view of material saving and efficiency.

The process of the formation of ribs which is the main part of the present invention is described in more detail in the following.

The mold used in the present invention has linear protrusions formed on both faces of a thin plate. The pattern of the linear protrusions is not particularly limited so long as it can enhance the stiffness of the film. As the planar shape of the linear ribs, vertical curved lines, vertical straight lines, inclined curved lines, inclined straight lines or a combination of these lines may be adopted. A shape having lines arranged parallel to the side edges of the bag is preferable.

It is preferred that the shape of the bag having ribs of the present invention has a constriction at the side part of the bag because it increases the stiffness of the bag.

As the mold used in the present invention, a mold made of a metal or a material having a high melting point can be used. When a cooling mechanism is formed at the inside of the mold for cooling the mold immediately after the molding, a mold made of a metal having good thermal conductivity is preferable.

The upper female mold and the lower female mold used in the present invention can be placed in close contact with the mold in such a manner that they can be opened or closed as desired by a driving mechanism. The female molds have about the same size as that of the mold and have linear cavities which penetrate the female molds and are placed at positions faced to those of the linear protrusions on the mold. In the present invention, the mold and the female molds may be designed to produce a single product at a time or may be designed in a several times larger size to produce several products at a time.

It is preferred that the female mold is made of a thermally insulating material or has a structure having a cooling mechanism because softening of the multi-layer resin film in the parts other than the parts exposed at the linear cavity parts which face the linear protrusions can be avoided.

The part of the multi-layer resin film exposed at the linear cavities of the female mold alone is heated to soften the heat adhesive resin layer when the female mold is placed between the multi-layer resin film and the heating panel and the multi-layer resin film is heated with the radiation from the heating panel.

For the upper heating panel and the lower heating panel in the present invention, a metal plate having a heater in it can be used. When the heating panel is heated by adjusting the temperature to a value higher than the melting point of the heat adhesive resin in the multi-layer resin film and lower than the melting point of another resin at the surface of the material sheet of the multi-layer resin film and moved close to the multi-layer resin film formed to the shape of ribs by the protrusions on the mold, the heat adhesive resin at the innermost layer of the multi-layer resin film alone can be softened.

The present invention has the characteristic that the heat adhesive resin protruded in the shape of a rib by the protrusion on the mold can be fixed to the shape of a rib by cooling the resin.

After the heat adhesive resin has been softened by the heating panels, the heating panels alone are moved away from the female molds while the female molds are kept pressed to the mold and the ribs can be fixed by natural cooling of the resin. The ribs can also be fixed by cooling with a stream of air blown to the cavity part or by rapidly cooling with a stream of cooling water or cooling gas at the inside of the mold.

When the ribs are fixed by the layer of the cooled and solidified heat adhesive resin, the layer of the resin having a higher melting point which is not softened at all by the treatment of forming ribs is deformed to have a shape similar to the shape of the cooled and solidified heat adhesive resin. Thus, convex ribs having the approximately same shape as that of the linear protrusion on the mold are formed on the surface of the layer of the resin having a high melting point and higher toughness when the shape of the whole multi-layer resin film is observed after the cooling.

Figure 8:
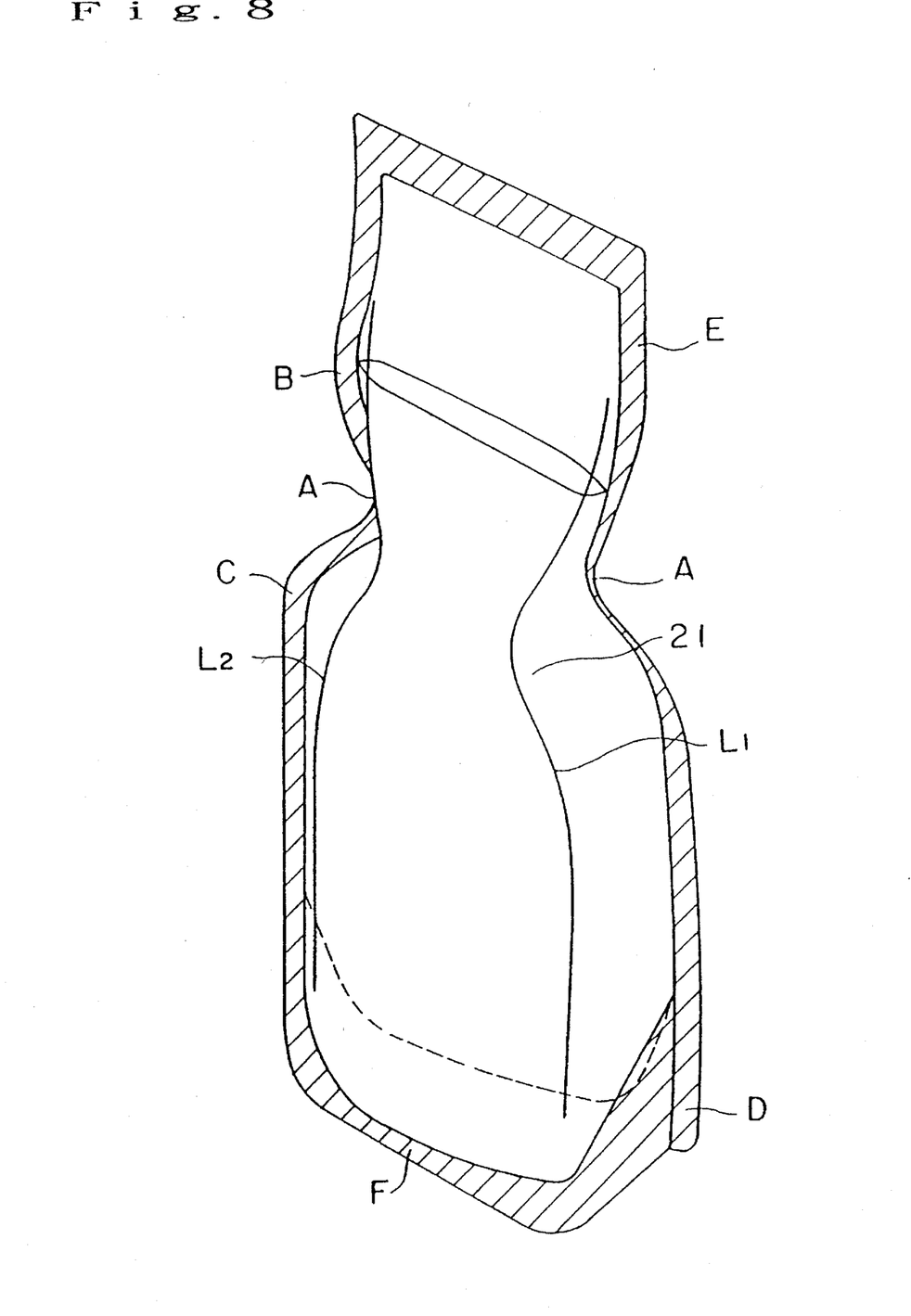
FIG. 8 shows a perspective view of the packaging bag having ribs of the present invention containing a fluid commercial product.

FIG. 8 shows a perspective view of the packaging bag having linear ribs of the present invention when it contains a commercial fluid product. The packaging bag has a high stiffness because it has ribs $L_1$ and $L_2$ convex to the outside on the surface of the bag. It can be handled almost in the same way as a glass bottle.

To summarize the advantages obtained by the invention, the packaging bag obtained by the process for production of a bag having linear ribs of the present invention has higher resistance to inward deformation of the bag at the positions on the linear ribs and has a higher stiffness of the bag because it has ribs formed on the faces of the bag in the shape convex to the outside. The bag can be produced continuously and efficiently by the process of the invention.

Particularly, the self-supporting bag produced by the process of the present invention has such a stiffness that the bag can be handled with a single hand almost in the same manner as a glass bottle for discharging the fluid content.

The present invention is described more specifically with reference to the figures of an example.

Figure 6:
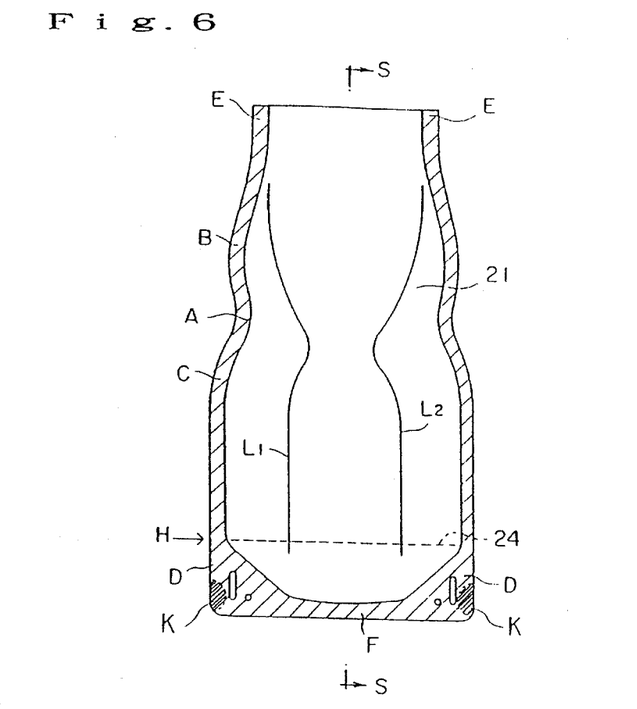
FIG. 6 shows a plan view of the self-supporting bag having ribs produced in the example of the present invention.
Figure 7:
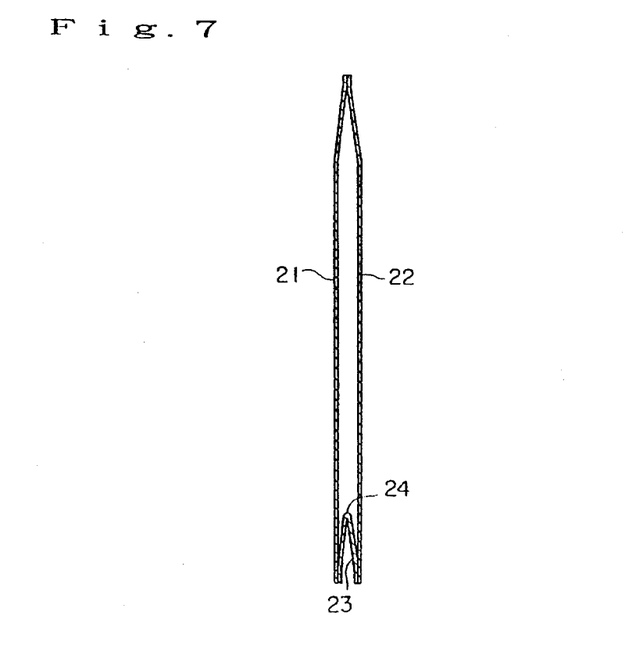
FIG. 7 shows a sectional view of the self-supporting bag having ribs produced in the example of the present invention.

FIG. 6 shows a plan view of a bag having ribs produced by the process of the example of the present invention. FIG. 7 shows a sectional view of said bag cut at the center line S—S.

The bag of the present example has a height (length to the vertical direction) of 200 mm, a width along the bottom edge D of 110 mm and a width along the top edge E of 65 mm. The width along the bottom edge of 110 mm is kept in the area from the bottom to the position of the central side edge C which is at the height about a half of the height of the bag. The width is decreased to 83 mm at the position of constriction A about 20 mm higher than the central side edge and then increased to 90 mm at the position of upper side edges B about 20 mm higher than the position of the constriction. The width is decreased to 65 mm at the position along the top edge E as described above.

On the surface of the bag, two convex ribs having a shape of curved line, $L_1$ and $L_2$, are formed symmetrically along the side edges from the part close to the bottom to the part close to the top as shown in FIG. 6. The bag has four ribs in all because similar ribs are formed also on the other surface of the bag. The height of the rib from the face of the bag is about 0.4 mm.

The self-supporting bag of the present invention exhibits a high degree of the self-supporting property because the stiffness is kept in the area extending to the top of the bag by the constriction of the width of the bag at C-A-B and the structure having four ribs on the surface of the bag.

The bag of the present example is composed of two multi-layer resin films forming the two faces of the bag, 21 and 22, and a multi-layer resin film of the bottom part 23. The films are put together at the edges in such a manner that the layers of the heat adhesive resin are faced to each other and heat sealed by heating from the outside with heating panels which are heated to a temperature higher than the melting point of the resin having a lower melting point.

In the side edge parts ranging from the top of the bag E to the position of the folded line of the film of the bottom part H (at the height of the folded line 24 of the multi-layer resin film of the bottom part 23) extending through B, A and C (the parts from E to H in the shaded area in FIG. 6), the multi-layer resin films forming the two faces, 21 and 22, are directly heat sealed to each other. In the side edge parts below H, the multi-layer resin film of the bottom part 23 is inserted in the folded form. Therefore, the edges of the multi-layer resin films, 21 and 22, are put together through the two edges of the folded multi-layer resin film of the bottom part 23 inserted between them at the inside of the side edges at the bottom D. The folded multi-layer resin film of the bottom part 23 has punched holes K and the multi-layer resin films forming the two faces of the bag, 21 and 22, are directly heat sealed to each other in the area of the punched holes.

In the heat sealed part at the bottom edge F excluding the side edges D, sheets forming the bag are heat sealed in such a manner that the bottom edge of the multi-layer resin film 21 is heat sealed to an edge of the folded multi-layer resin film of the bottom part 23 faced to it and, separately, the bottom edge of the multi-layer resin film 22 is heat sealed to the other edge of the folded multi-layer resin film of the bottom part 23 faced to it. Therefore, in the area other than the side edges at the bottom D, the two edges of the folded multi-layer resin film of the bottom part 23 are not heat sealed to each other but placed in a separated form.

For heat sealing the multi-layer resin films to form the bag of the example in the present invention, the heat sealing part at the bottom edge F is heat sealed from the outside with the heating panels which are adjusted to a temperature between the melting point of the heat adhesive resin having a lower melting point and the melting point of the resin having a higher melting point and separate heat sealed bottom edges F are formed between each of the two edges of the folded multi-layer resin film of the bottom part 23 and each of the bottom edges of the multi-layer resin films, 21 and 22. Then, the side edges at the bottom D and side edges C, A, B and E are heat sealed to produce the bag. In the present example, the process of forming ribs is added to the process described above.

Figure 1:
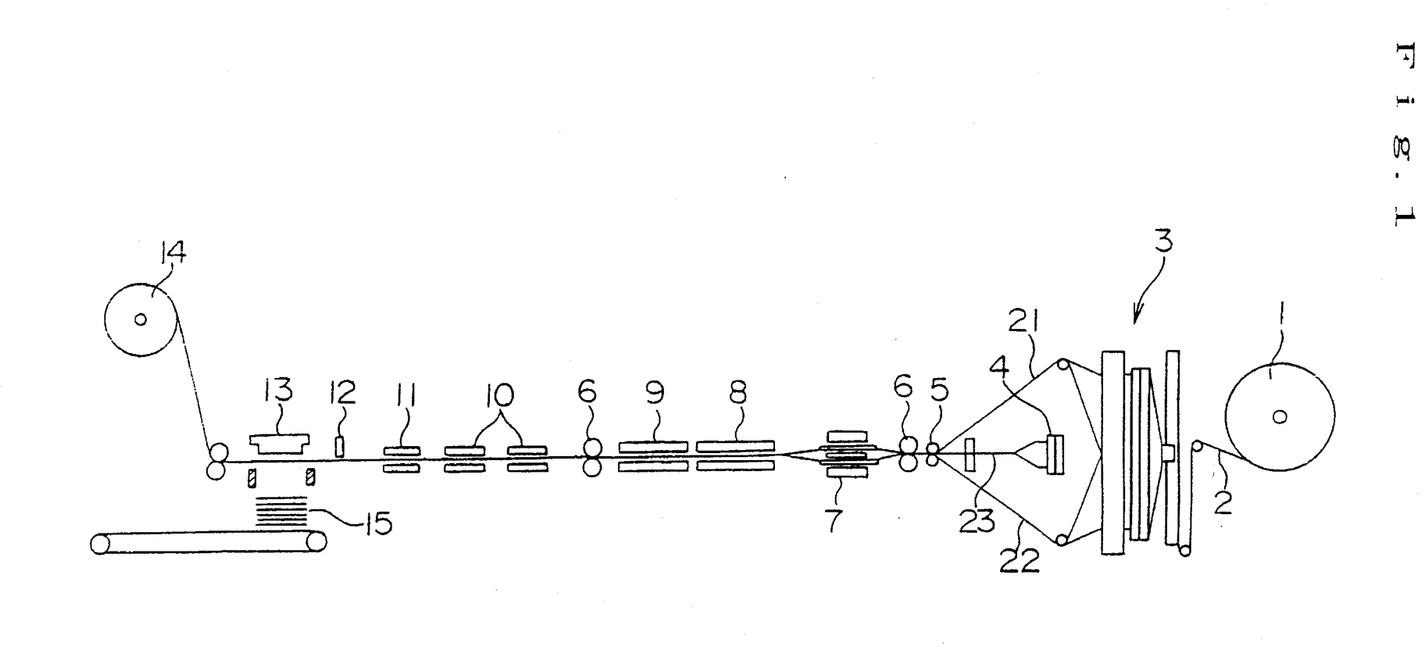
FIG. 1 is a schematic diagram showing a process for production of a bag having linear ribs as an example of the present invention.
Figure 2:
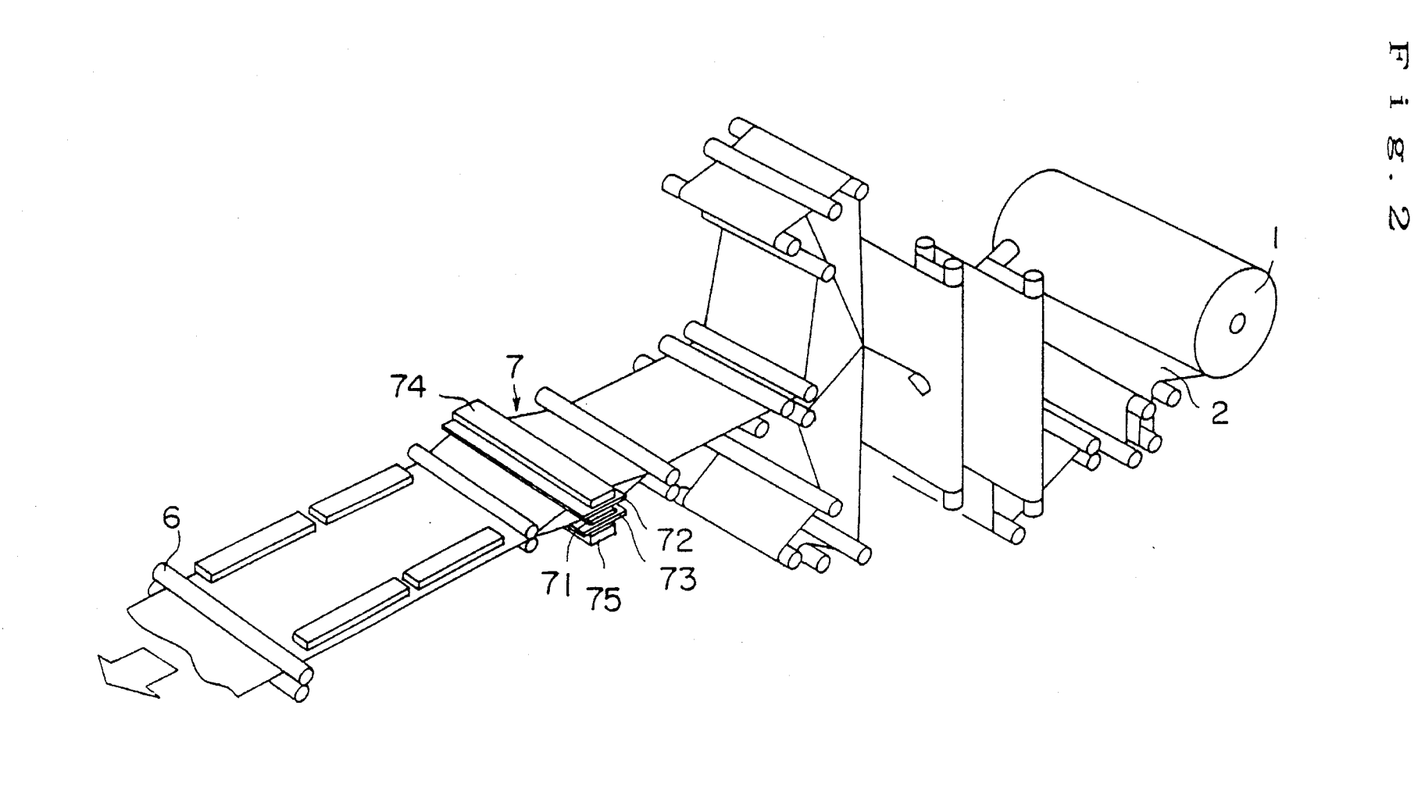
FIG. 2 shows a perspective view of the process of forming ribs in the example of the present invention.

FIG. 1 shows the outline of the apparatus for production of the bag having linear ribs of the present invention. FIG. 2 is a perspective view showing a part of the apparatus shown in FIG. 1.

In FIG. 1, the long sheet of the material sheet of the multi-layer resin film 2 (composition, a two-layer film prepared by laminating a polyethylene film of 140 μm thickness and a stretched 66 nylon film of 15 μm thickness; the total thickness, 160 μm; width, 550 mm) is supplied from the roll of the material sheet of the multi-layer resin film 1 shown at the fight end of FIG. 2. It is then pulled through dancer rolls 3 and rotated by 90 degrees with a direction guide (not shown in the figure). It is then cut with a cutter at the center of the sheet along the longitudinal direction of the sheet and separated into two sheets of the multi-layer resin film, 21 and 22.

The folded multi-layer resin film of the bottom part 23 is supplied from the folding and feeding apparatus for the multi-layer resin film of the bottom part 4 and inserted between the two sheets of the multi-layer resin film separated to the upper position and the lower position as shown in FIG. 1 at the position of the edge of the sheets. The combined films are laminated together with lamination rolls 5. The laminated film is then transferred by transfer rolls 6 with the one-pitch movement and fed to the apparatus for forming ribs 7. The linear ribs having the shape of curved lines described above are formed on the multi-layer resin films, 21 and 22, using this apparatus.

In the next process at the heat sealing unit of the bottom part 8, a metal plate is inserted between the sheets of the folded multi-layer resin film of the bottom part 23 which has been inserted between the edge parts of the upper and lower multi-layer resin films, 21 and 22, corresponding to the bottom parts of the bag. The heat sealed part at the bottom F is formed between the bottom edges of the multi-layer resin films, 21 and 22, and the edges of the multi-layer resin film of the bottom part 23 by pressing them for heat sealing from the outside. The heat sealed part F is cooled with a cooling unit for the bottom sealing 9. When the heat sealed part at the bottom F has a shape concave at the center as shown in (b) of FIG. 9, stability of the bag at the bottom part can be further enhanced.

After the heat sealed part at the bottom F has been formed, the multi-layer resin film is transferred to the sealing unit for side edges 10 with transfer rolls 6. Side edge parts ranging from D to E through C, A and B are heat sealed using the heat sealing unit for side edges 10. The heat sealed parts are cooled using the cooling unit for side sealing 11. The position for cutting is detected by a photoelectric tube for detecting the position of cutting 12. The bag of the product 15 is obtained by cutting off from the film with the apparatus for cutting 13. The remaining scrap sheet is wound by the scrap winding apparatus 14. The top edge of the bag is sealed after the bag is charged with a content.

As shown in FIG. 2, the apparatus for forming linear ribs 7 has the mold 71 at the center, the upper female mold 72 and the lower female mold 73 at the upper position and at the lower position of the mold, respectively, and the upper heating panel 74 and the lower heating panel 75 at the further upper position and at the further lower position of the female molds, respectively. The two long sheets of the multi-layer resin film, 21 and 22, are fed to the apparatus for forming linear ribs separately at the upper position and at the lower position of the mold 71 while the folded multi-layer resin film of the bottom part 23 is kept between the edges of the sheets.

The apparatus for forming linear ribs 7 which is the characteristic of the present invention is described in more detail.

Figure 3:
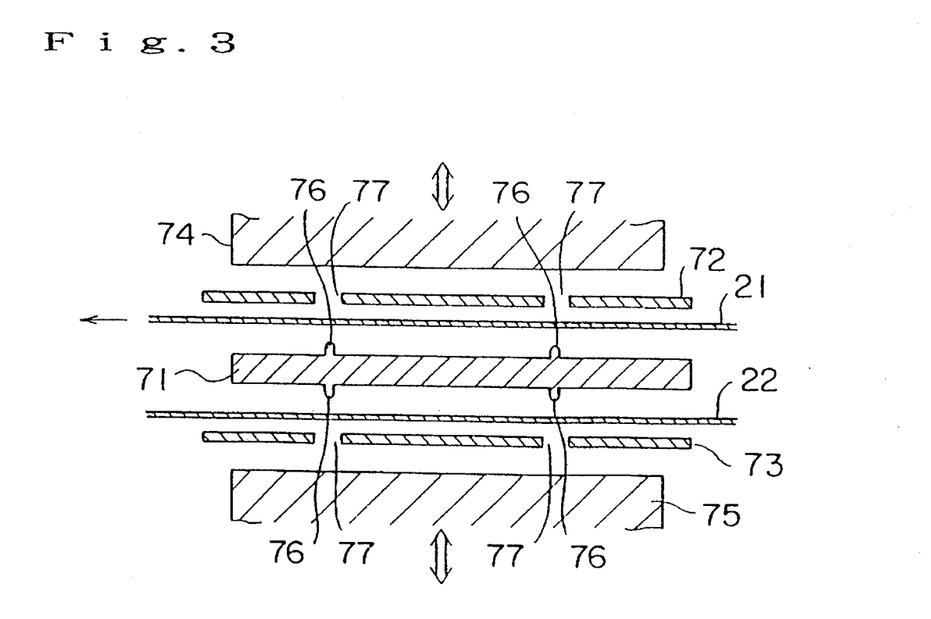
FIG. 3 shows a sectional view of the process of forming ribs in the example of the present invention.
Figure 4:
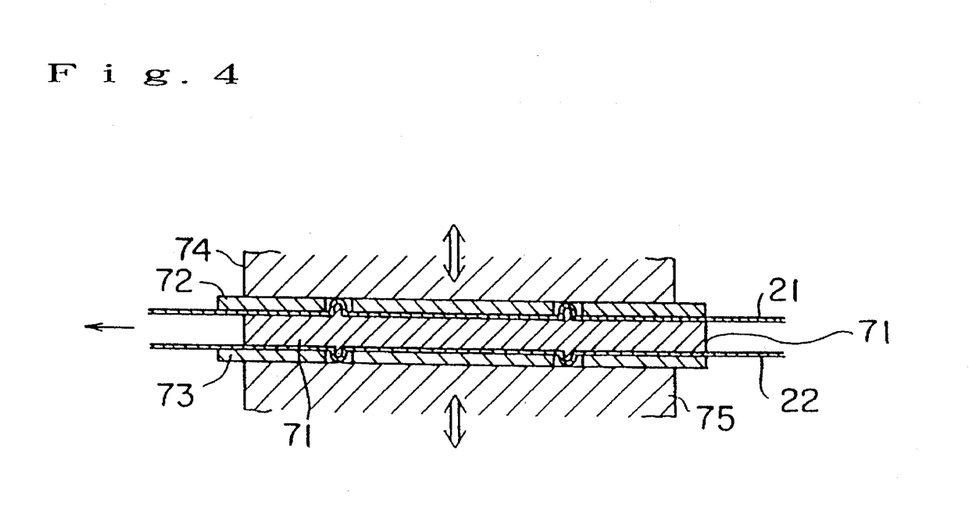
FIG. 4 shows another sectional view of the process of forming ribs in the example of the present invention.

FIG. 3 and FIG. 4 show sectional views of the apparatus for forming linear ribs when the heating panels of the apparatus are open and closed for compression, respectively. In the apparatus for forming linear ribs, the upper female mold 72 and the lower female mold 73 are placed at both sides of the single mold 71. The upper heating panel 74 and the lower heating panel 75 are placed at both sides of the combined mold and female molds. The female molds, 72 and 73, are equipped with a mechanism for pressing them to the mold 71 from both sides and can hold the multi-layer resin films on the mold 71. The upper heating panel 74 and the lower heating panel 75 can simultaneously compress the three pieces composed of the mold and the two female molds together from both sides using a mechanism as shown in FIG. 4. The compression can also be released using the mechanism as shown in FIG. 3. The compression and the release can be repeated alternately.

The upper multi-layer resin film 21 and the lower multi-layer resin film 22 separated in the preceding process are fed to both sides of the mold 71 equipped with a cooling apparatus (not shown in the figures) intermittently with the one-pitch movement in such a manner that the polyethylene layers are faced to the mold. The multi-layer resin film of the bottom part 23 is not related to the operation of forming linear ribs because it is placed at the edge of the film. The multi-layer resin film of the bottom part 23 may also be inserted after the process of forming linear ribs is finished.

The mold 71 has a shape of a plate having about the same size as that of the bag. On both faces of the mold, linear protrusions having the same shape as that of the linear ribs shown in FIG. 6 are formed. The linear protrusions have a width of 0.5 mm and a height of 0.5 mm.

The upper and lower females molds, 72 and 73, have a shape of a sheet having the same size as that of the mold. They are made of a thermally insulating material and have the linear cavities 77 penetrated through the sheet and having the shape corresponding to that of the linear protrusions.

Figure 11:
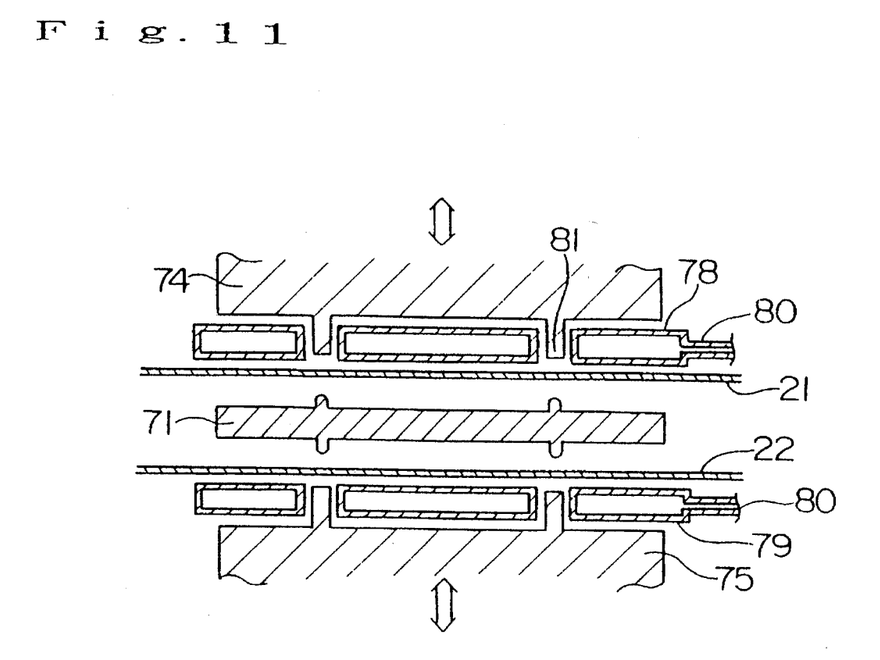
FIG. 11 shows a sectional view of the apparatus for forming linear ribs in the condition that heating panels are open.
Figure 12:
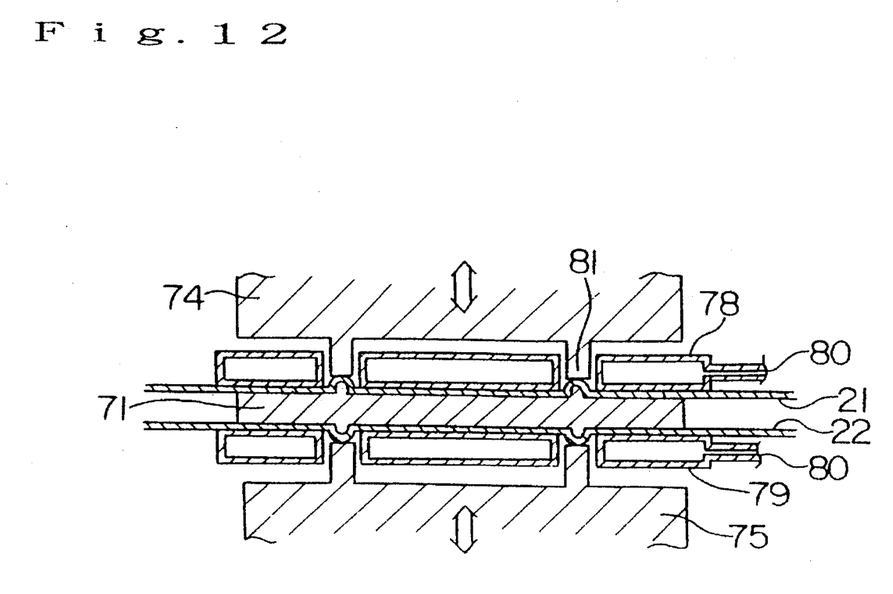
FIG. 12 shows a sectional view of the apparatus for forming linear ribs in the condition that heating panels are closed for compression.

In the present invention, the female mold can be cooled at the inside by using a mold having a cavity in them and passing cooling water through the cavity. FIG. 11 shows a sectional view of the apparatus for forming linear ribs in the condition that the heating panels are open. FIG. 12 shows a sectional view of the apparatus for forming linear ribs in the condition that the heating panels are closed for compression. Through the upper female mold 78 having a cavity in it and the lower female mold 79 having a cavity in it, cooling water is passed from an inlet of the cooling water 80 (an outlet of the cooling water is not shown in the figures.) to prevent increase in the temperature of the female molds by the heat of the heating panel. Therefore, temperature of the heating panels can be adjusted to a higher value within the range lower than the melting point of the resin having a high melting point in the multi-layer resin film and productivity of the process for formation of linear fibs can be increased. The heating panels shown in FIG. 10 and FIG. 11 do not have a shape of a simple fiat plate but have protrusions 81 which fit the linear cavities 77 in the upper and lower female molds. Thus, the parts of the linear ribs on the multi-layer resin film can be heated exclusively and efficiently.

When the movement of the multi-layer resin film fed to both sides of the mold 71 by the one-pitch movement of the transfer rolls 6 as shown in FIG. 2 stops, the upper female mold 72 and the lower female mold 73 are pushed to the multi-layer resin films, 21 and 22, at both sides of the mold 71 from both sides by a driving mechanism (not shown in the figure) to hold the multi-layer resin films. Then, the upper heating panel 74 heated to 170° C. is moved downward and the lower heating panel 75 heated to 170° C. is moved upward both by a driving mechanism of the heating panels (not shown in the figure). Parts of the multi-layer resin films, 21 and 22, are pushed into the linear cavities 77 of the upper and lower female molds by the protrusions 76 on the mold 71 and the remaining part of the films are pressed to the face of the mold 71 by the sheet parts of the upper and lower female molds.

When the multi-layer resin film is kept strongly pressed in this condition for 1 second, the nylon layers in the multi-layer resin films, 21 and 22, are softened to some degree by the heating panel of 170° C. though they do no melt. The polyethylene layers at the other side are softened as well.

Then, the heating panels are released by moving them to the opposite directions to the above and separated from the multi-layer resin films. The multi-layer resin films, 21 and 22, on which linear ribs are formed are kept pressed to the mold 71 by the driving mechanism for the female molds and cooled with a strong air stream (15° C., for 2 seconds) while the shape of the linear ribs are maintained. Thus, the shape of the linear ribs is fixed. The upper female mold 72 and the lower female mold 73 are released and the multi-layer resin film is peeled from the mold 71. Thus, the multi-layer resin films having linear ribs, 21 and 22, are prepared. By moving the multi-layer resin films by one pitch, the next pair of the multi-layer resin film is fed to both sides of the mold. The above operations are repeated.

As another process of cooling, the heat adhesive resin layer may be cooled with water or air at the inside of the mold 71.

By the processes described above, linear ribs having protruded shapes can be formed on the whole layers of the multi-layer resin film.

Figure 5:
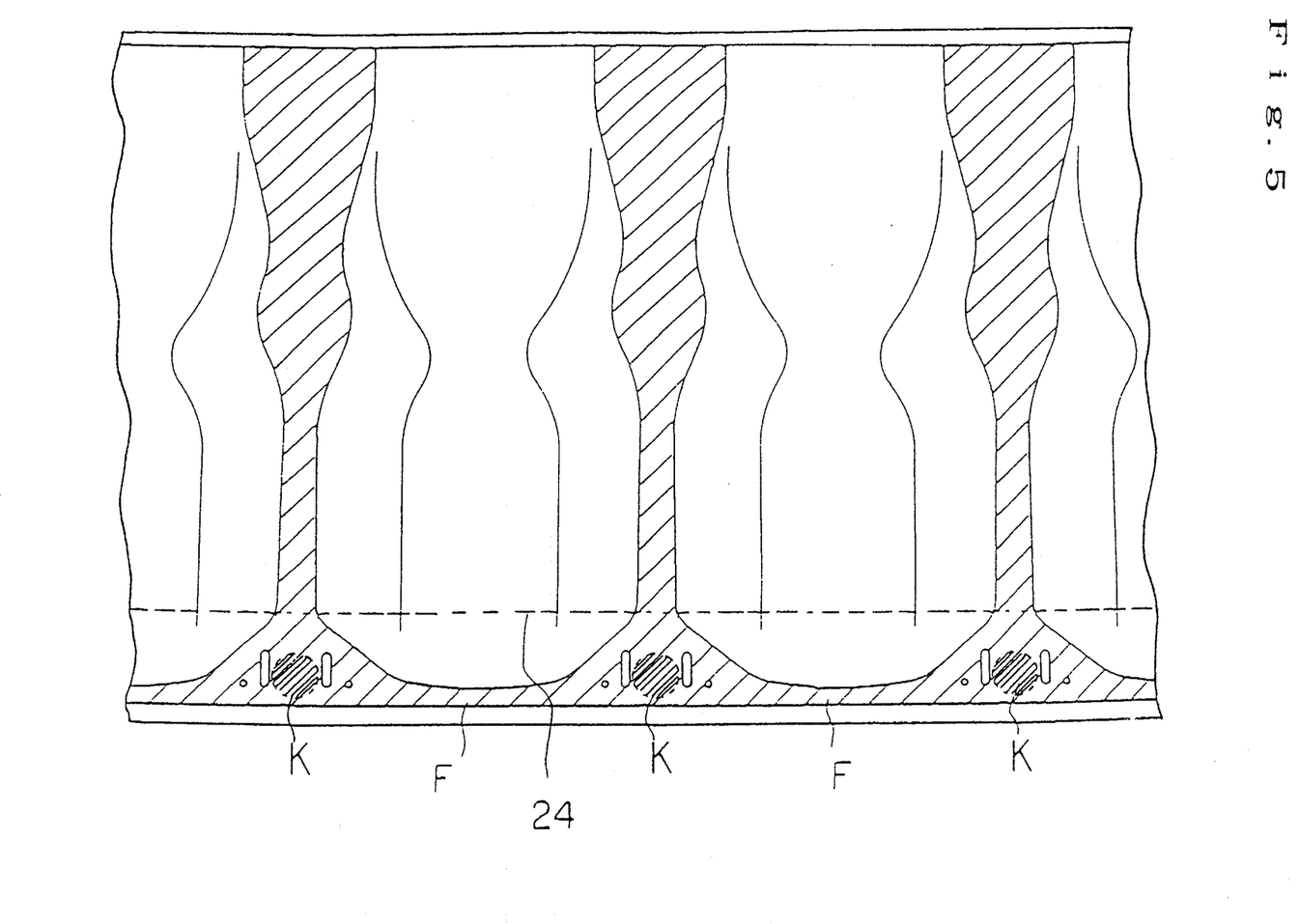
FIG. 5 shows a plan view of the material sheet prepared in an example of the present invention from which bags are continuously formed.

Then, heating panels are pressed to the metal plate inserted to the inside of the folded sheet which is inserted between the edges of the multi-layer resin films, 21 and 22, in such a manner that the sectional structure has a W shape and the heat sealed part at the bottom edge F is formed. Thus, the structure of gazette folding having a W-shape is formed at the bottom part. The parts corresponding to the peripheral edges of the bag are heat sealed. As the result of the processes described above, a material sheet of the multi-layer resin film on which the bags are formed continuously as shown in FIG. 5 is obtained. The bag can be obtained by cutting off from the material sheet thus obtained.

What is claimed is:

1. A process for production of a bag having linear ribs comprising:

(a) providing first and second material sheets, said first and second material sheets being formed from a multi-layer resin film having a surface layer of a heat adhesive resin with a low melting point;

forming linear ribs on said first and second material sheets by providing a plate shaped mold having an upper face and a lower face, the upper face and the lower face of the plate shaped mold each having linear protrusions, and introducing the first of the material sheets into a space between the upper face of the plate shaped mold and an upper female mold disposed at the upper face of the plate shaped mold and introducing the second of the material sheets into a space between the lower face of the plate shaped mold and a lower female mold disposed at the lower face of the plate shaped mold, the layers of the heat adhesive resin having a low melting point which face the plate shaped mold; the upper female mold and the lower female mold have penetrated linear cavities at positions corresponding to the linear protrusions on the upper and lower faces of the plate shaped mold, said cavities exposing portions of the material sheets, and the upper female mold and the lower female mold being capable of opening or closing, an upper heating panel being disposed at an upper side of the upper female mold and a lower heating panel being disposed at a lower side of the lower female mold, the heating panels providing heat to the linear cavities and to said exposed portions of the material sheets; the heating panels being capable of opening and closing;

pushing the material sheets at the exposed portions over or below the linear protrusions on both faces of the plate shaped mold into the linear cavities of the female molds by pressing the upper female mold and the lower female mold toward the plate shaped mold with a driving mechanism of the female molds or by moving the upper heating panel and the lower heating panel toward the plate shaped mold from outside of the female molds with a driving mechanism of the heating panels, the heating panels being heated to a temperature of or above the softening point of the heat adhesive resin, thereby forming linear ribs on the sheets;

(b) heat sealing the material sheets of the multi-layer resin film having linear ribs at portions thereof corresponding to peripheral parts of the bag to be produced including a bottom and side edges; and (c) cutting off and separating the heat sealed parts from the material sheets to produce the bag.

2. A process for production of a bag having linear ribs as claimed in claim 1, wherein the process further comprises fixing the linear ribs by cooling immediately after step (a).

3. A process for production of a bag having linear ribs as claimed in claim 2, wherein step (b) further comprises:

inserting a separate folded material sheet for forming a bottom of the bag, said separate folded material sheet being formed from a multi-layer resin film having a surface layer of a heat adhesive resin with a low melting point, between end edge portions on each opposing end of first and second material sheets of the multi-layer resin film in such a manner that in a portion between the end edge portions of each of the first and second material sheets, a layer of the heat adhesive resin of each of the first and second material sheets faces the layer of the heat adhesive resin of the separate folded material sheet, and each of the end edge portions of the first and second material sheets together with the inserted separate folded sheet form a W-shape;

connecting the first and second material sheets as a continuous sheet to the separate folded material sheet by heat sealing the separate folded material sheet separately to a respective lower end edge of each of the first and second material sheets; and heat sealing portions corresponding to the side edges of the bag.

4. A process for production of a bag having linear ribs as claimed in claim 1, wherein step (b) further comprises:

inserting a separate folded material sheet for forming a bottom of the bag, said separate folded material sheet being formed from a multi-layer resin film having a surface layer of a heat adhesive resin with a low melting point, between end edge portions on each opposing end of first and second material sheets of the multi-layer resin film in such a manner that in a portion between the end edge portions of each of the first and second material sheets, a layer of the heat adhesive resin of each of the first and second material sheets faces the layer of the heat adhesive resin of the separate folded material sheet and each of the end edge portions of the first and second material sheets together with the inserted separate folded material sheet form a W-shape;

connecting the first and second material sheets as a continuous sheet to the separate folded material sheet by heat sealing each end of the separate folded material sheet separately to a respective lower end edge of each of the first and second material sheets; and heat sealing portions corresponding to side edges of the bag.

5. A process for production of a bag having linear ribs as claimed in claim 1, wherein the plate shape mold has a cooling mechanism.

6. A process for production of a bag having linear ribs as claimed in claim 5, wherein portions of the upper female mold and the lower female mold, other than portions adjacent to the linear cavities, are made of a thermally insulating material or have a cooling mechanism.

7. A process for production of a bag having linear ribs as claimed in claim 6, wherein step (b) further comprises:

inserting a separate folded material sheet for forming a bottom of the bag, said separate folded material sheet being formed from a multi-layer resin film having a surface layer of a heat adhesive resin with a low melting point, between end edge portions on each opposing end of first and second material sheets of the multi-layer resin film in such a manner that in a portion between the end edge portions of each of the first and second material sheets, a layer of the heat adhesive resin of each of the first and second material sheets faces the layer of the heat adhesive resin of the separate folded material sheet, and each of the end edge portions of the first and second material sheets together with the inserted separate folded material sheet form a W-shape;

connecting the first and second material sheets as a continuous sheet to the separate folded material sheet by heat sealing the separate folded material sheet separately to a respective lower end edge of each of the first and second material sheets; and heat sealing portions corresponding to side edges of the bag.

8. A process for production of a bag having linear ribs as claimed in claim 6, wherein an outermost layer of the multi-layer resin film has a melting point higher than that of the heat adhesive resin in an innermost layer of the multi-layer resin film, and the heating panels are heated to a temperature higher than the melting point of the heat adhesive resin and lower than the melting point of the resin of the outermost layer.

9. A process for production of a bag having linear ribs as claimed in claim 1, wherein portions of the upper female mold and the lower female mold, other than portions adjacent to the linear cavities, are made of a thermally insulating material or have a cooling mechanism.

10. A process for production of a bag having linear ribs as claimed in claim 1, wherein the linear ribs form a planar shape of vertical curved lines, vertical straight lines, inclined curved lines, inclined straight lines or a combination thereof.

11. A process for production of a bag having linear ribs as claimed in claim 1, wherein a portion of the side edges of the bag are constricted.

12. A process for production of a bag having linear ribs as claimed in claim 1, wherein an outermost layer of the multi-layer resin film has a melting point higher than that of the heat adhesive resin in an innermost layer of the multi-layer resin film and the heating panels are heated to a temperature higher than the melting point of the heat adhesive resin and lower than the melting point of the resin of the outermost layer.

13. A process for the production of a bag having linear ribs as claimed in claim 12, wherein the innermost layer comprises a resin selected from the group consisting of polyethylene, polypropylene, polystyrene, an ethylene-vinyl acetate copolymer and polyethylene terephthalate.

14. A process for the production of a bag having linear ribs as claimed in claim 13, wherein the outermost layer comprises a resin selected from the group consisting of a nylon, a polyester resin, a polycarbonate, polypropylene, an ionomer and a polyether.

15. A process for the production of a bag having linear ribs as claimed in claim 14, wherein the outermost layer comprises a resin selected from the group consisting of nylon 6, nylon 66, polyethylene terephthalate and polybutylene terephthalate.

16. A process for the production of a bag having linear ribs as claimed in claim 1, wherein the layer of the heat adhesive resin is selected from the group consisting of a layer of a polyolefin modified with maleic anhydride and a layer of an isocyanate adhesive material.

* * * * *